Patented Jan. 6, 1948

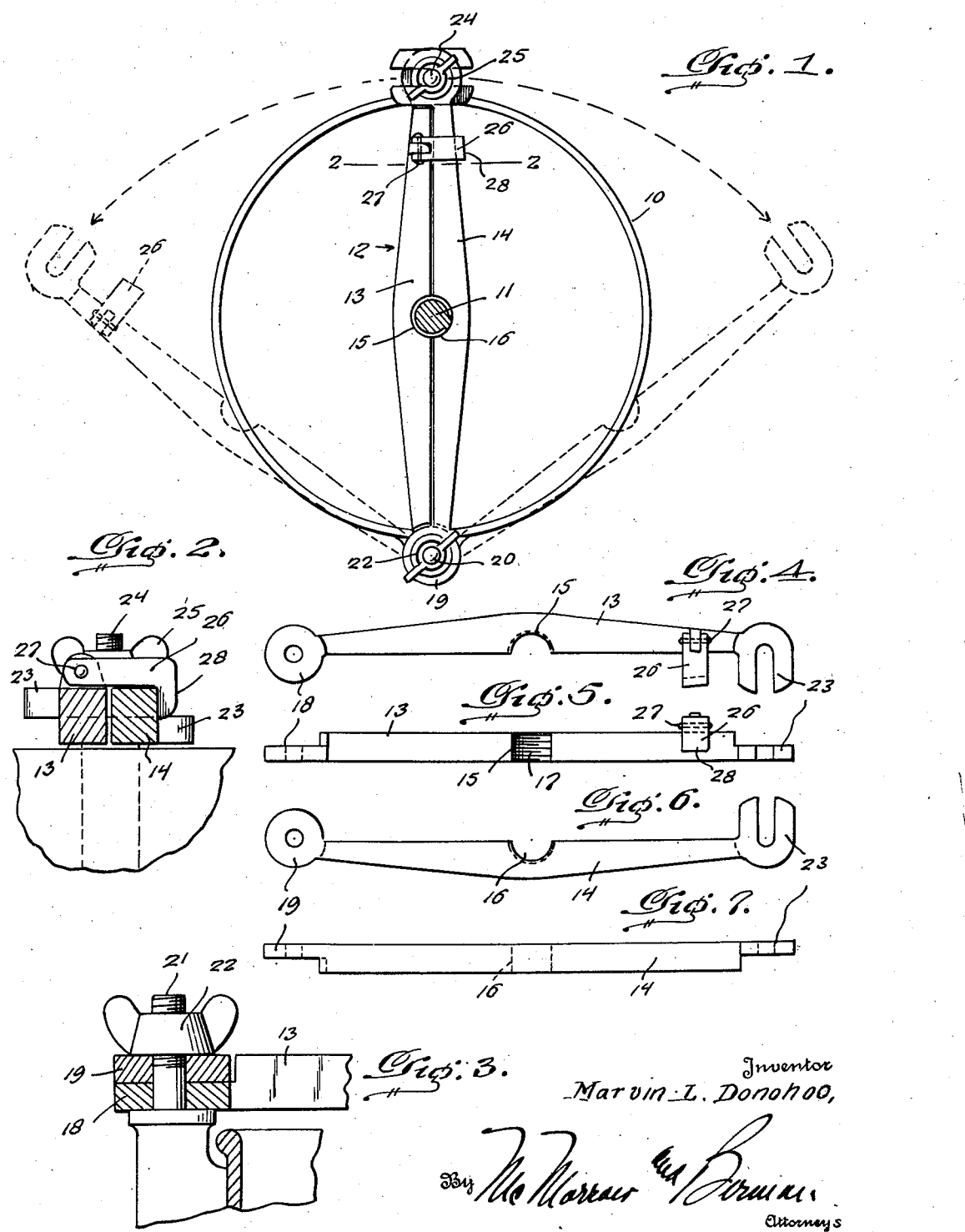

2,434,036

UNITED STATES PATENT OFFICE 2,434,036

PRESS

Marvin L. Donohoo, Pearl, Ill.

Application November 10, 1944, Serial No. 562,812

1 Claim. (Cl. 100—44)

This invention relates to presses and more particularly to such for use in the pressing of meat, lard and other commodities, and for the expressing of fruit juices. It has to do primarily with the improvement of the cross head or supporting element for the usual screw threaded shank or stem of the plunger element of the press. To this end, the invention consists in the provision of a divided cross head or support for the plunger stem or shank and consisting of two complemental companion members having screw threaded semi-circular recesses in the meeting sides and midway between the ends of the members, said members being hingedly mounted at one end and having provision at their opposite ends for releasable attachment to each other, so that, in the closed position of the members, the screw threaded recessed middle portions thereof produce a screw threaded bore through which the stem or shank member of the press plunger works.

A practical but non-limiting exemplification of the invention is illustrated in the accompanying drawings, in which:

Figure 1 is a top plan view showing, in full lines, the cross head or press plunger supporting members in closed position, and, in dotted lines, the same in partially opened position;

Figure 2 is a fragmentary section taken on about the line 2—2 of Figure 1;

Figure 3 is a fragmentary sectional view of the hinged portion of the device;

Figure 4 is a top plan view of one of the cross head members detached;

Figure 5 is an inner side elevation of the member shown in Figure 4;

Figure 6 is a top plan view of the companion cross head member; and

Figure 7 is an outer side elevation of the member shown in Figure 6.

Referring now to the drawings in detail, the numeral 10 designates generally the body of a conventional press which may be cylindrical in form as indicated in Figure 1 or of any other suitable construction which, if desired, may be in the form of an open framework. In use, a container for the material to be pressed (not shown in detail) is placed in this body portion 10 to receive therein the plunger element of the press (also not shown in detail). The screw threaded stem or shank portion 11 of the press plunger is, however, indicated in cross section in Figure 1.

The cross head or plunger support 12 of the press, as shown, comprises a companion pair of elongated members 13, 14, the member 13 having a semi-circular recess 15 at the middle of its longitudinal inner side and the companion member 14 having a corresponding recess 16, said recesses being screw threaded as indicated at 17 in Figure 5. When the two members 13 and 14 are in closed position as shown in Figure 1, the registered recesses 15 and 16 provide a screw threaded bore through which the plunger stem or shank 11 works. The cross members 13 and 14 are respectively flattened and apertured at one end, as at 18 and 19, for hinged attachment as a rule joint on a stud 20 provided at one side of the body portion 10 of the press. The supporting stud 20 is screw threaded, as at 21, for the application of a wing nut 22 by which the cross members 13 and 14 may be tightened in both open and closed positions. The opposite ends of the members 13 and 14 are bifurcated, as at 23, so as to releasably engage a stud 24 provided on the press body 10 diametrically opposite the stud 20. A wing nut 25 is provided on the stud 24 for fastening the members 13 and 14 in the closed position shown in Figure 1.

An angular latch member 26 (see Figure 2) is hingedly mounted, as at 27, on the cross head member 13. In the closed position of this latch member 26 its right angular portion 28 is engaged over the companion cross head member 14 so as to releasably hold the two members in their closed relation as shown in Figures 1 and 2.

By the provision of a press of the character described with the pair of cross head members hingedly mounted as they are and having means for releasably holding them in closed position, a stable support is afforded for the plunger operating screw 11 of the press. At the same time, the companion members 13 and 14 are readily swung apart and clear of the body portion 10 of the press so that the plunger with its operating stem or shank 11 as thus released from the members 13 and 14, and also the container in which the material is pressed, is liftable freely from the press body 10, at will, thereby facilitating the placing of the container and plunger for use and its removal after use.

The illustrated construction and arrangement is but one practical embodiment of the invention. Modifications are contemplated within the spirit and scope of the appended claim. The invention, therefore, is not limited to the specific construction and arrangement shown.

Having thus described the invention, what is claimed is:

The herein described plunger support for a press of the character described, said support comprising a pair of elongated members flattened at one end and hingedly supported as a rule joint on a supporting stud at one side of the press, the opposite end portions of the support members being flattened to meet in overlapped relation and bifurcated to engage a supporting stud on the press diametrically opposite the stud which supports the hingedly connecting end portions of said support members, and means adjacent the bifurcated end portions of said members for releasably retaining said members in closed relation, the meeting sides of said support members being recessed semi-circularly midway between the ends thereof and screw threaded so as to provide a screw threaded bore for the reception and operation of the screw threaded stem of the press plunger in the closed position of said support.

MARVIN L. DONOHOO.

REFERENCES CITED

The following references are of record in the file of this patent:

UNITED STATES PATENTS

| Number | Name | Date |
| --- | --- | --- |
| 721,023 | Cosper | Feb. 17, 1903 |
| 244,604 | Hoguet | July 19, 1881 |

FOREIGN PATENTS

| Number | Country | Date |
| --- | --- | --- |
| 836,011 | France | Oct. 10, 1938 |